United States Patent
Broulidakis et al.

(10) Patent No.: US 9,951,624 B2
(45) Date of Patent: Apr. 24, 2018

(54) CLINCH NUT BOLT HOLE GEOMETRY

(71) Applicant: UNITED TECHNOLOGIES CORPORATION, Hartford, CT (US)

(72) Inventors: Alexander Broulidakis, Tolland, CT (US); Jonathan Lemoine, Vernon, CT (US); Joseph J. Sedor, Oxford, MA (US); Patrick Michael Nadeau, Newington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 443 days.

(21) Appl. No.: 14/617,594

(22) Filed: Feb. 9, 2015

(65) Prior Publication Data

US 2016/0230603 A1    Aug. 11, 2016

(51) Int. Cl.
| | | |
|---|---|---|
| *F01D 5/08* | (2006.01) | |
| *F01D 9/06* | (2006.01) | |
| *F01D 25/12* | (2006.01) | |
| *F01D 25/16* | (2006.01) | |

(52) U.S. Cl.
CPC .............. *F01D 5/081* (2013.01); *F01D 9/065* (2013.01); *F01D 25/125* (2013.01); *F01D 25/162* (2013.01); *Y02T 50/673* (2013.01); *Y02T 50/676* (2013.01)

(58) Field of Classification Search
CPC ...... F16B 37/065; F16B 37/068; F16B 37/14; F16B 37/145; F16B 39/02; F16B 39/025; F16B 39/026; F16B 33/002; F01D 5/081; F01D 9/065; Y02T 50/676; Y02T 50/673; Y10T 403/75

USPC .............. 411/180, 181; 403/408.1
See application file for complete search history.

(56) References Cited

U.S. PATENT DOCUMENTS

| | | | |
|---|---|---|---|
| 1,872,616 A | 8/1932 | Andren | |
| 2,138,409 A | 7/1937 | Salter | |
| 2,110,039 A | 3/1938 | Double | |
| 2,112,594 A | 3/1938 | Double | |
| 3,373,648 A * | 3/1968 | Pitzer | F16B 13/066 411/24 |
| 3,909,927 A | 10/1975 | Steward | |
| 7,160,047 B2 | 1/2007 | Mueller et al. | |
| 7,195,447 B2 | 3/2007 | Moniz et al. | |
| 8,061,969 B2 | 11/2011 | Durocher et al. | |
| 8,091,371 B2 | 1/2012 | Durocher et al. | |
| 2006/0093465 A1 | 5/2006 | Moniz et al. | |
| 2008/0134687 A1 | 6/2008 | Kumar et al. | |
| 2010/0135770 A1 | 6/2010 | Durocher et al. | |
| 2011/0064515 A1 | 3/2011 | Ruckey et al. | |
| 2011/0079019 A1 | 4/2011 | Durocher et al. | |
| 2011/0081237 A1 | 4/2011 | Durocher et al. | |
| 2012/0317789 A1 * | 12/2012 | Moon | F16B 5/02 29/525.11 |
| 2013/0094951 A1 | 4/2013 | McCaffrey | |

(Continued)

*Primary Examiner* — Ian Paquette
(74) *Attorney, Agent, or Firm* — Carlson, Gaskey & Olds, P.C.

(57) ABSTRACT

A fastener assembly includes a first component including a first fastener opening that has a cylindrical portion and a conical portion. A second component includes a second fastener opening. A fastener for extending through the first fastener opening and the second fastener opening and a clinch nut for attaching to the fastener is included.

17 Claims, 5 Drawing Sheets

(56) References Cited

U.S. PATENT DOCUMENTS

2013/0202450 A1* 8/2013 Ivakitch ............... F16D 1/076
   416/248
2014/0102110 A1   4/2014 Farah et al.

* cited by examiner

CLINCH NUT BOLT HOLE GEOMETRY

BACKGROUND

The present disclosure relates generally to a gas turbine engine, and in particular to a mid-turbine frame (MTF) included in a gas turbine engine.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A mid-turbine frame (MTF) is positioned between a high pressure turbine stage and a low pressure turbine stage of a gas turbine engine. The MTF supports one or more bearings and transfers bearing loads from an inner portion of the gas turbine engine to an outer engine frame. The MTF also serves to route air from the high pressure turbine stage to the low pressure turbine stage.

SUMMARY

In one exemplary embodiment, a fastener assembly includes a first component including a first fastener opening that has a cylindrical portion and a conical portion. A second component includes a second fastener opening. A fastener for extending through the first fastener opening and the second fastener opening and a clinch nut for attaching to the fastener is included.

In a further embodiment of the above, the cylindrical portion includes a first diameter and the conical portion extends from the first diameter to a second diameter greater than the first diameter.

In a further embodiment of any of the above, the second fastener opening includes a second conical portion.

In a further embodiment of any of the above, the second conical portion is located between a first cylindrical portion and a second cylindrical portion.

In a further embodiment of any of the above, the clinch nut includes a clinch nut flange that extends into the second fastener opening.

In a further embodiment of any of the above, the clinch nut includes an anti-rotation tab that engages a portion of the second component.

In a further embodiment of any of the above, the first component is an inner frame case and the second component is a tie rod.

In a further embodiment of any of the above, the fastener is made of a dissimilar material from the first component.

In another exemplary embodiment, a mid-turbine frame assembly includes a mid-turbine frame located axially between a first turbine and a second turbine. The mid-turbine frame includes an inner frame case including a first fastener opening having a cylindrical portion and a conical portion. A tie rod includes a second fastener opening. A fastener for extending through the first fastener opening and the second fastener opening and a clinch nut for attaching to the fastener are included.

In a further embodiment of any of the above, the cylindrical portion includes a first diameter. The conical portion extends from the first diameter to a second diameter greater than the first diameter.

In a further embodiment of any of the above, the second fastener opening includes a second conical portion located between a first cylindrical portion and a second cylindrical portion.

In a further embodiment of any of the above, the clinch nut includes a clinch nut flange that extends into the second fastener opening.

In another exemplary embodiment, a method of assembling a portion of a gas turbine engine includes locating a tie rod adjacent an inner frame and aligning a first fastener opening in the tie rod with a second fastener opening the in inner frame case. The first fastener opening has a cylindrical portion and a conical portion. A fastener is inserted through the first fastener opening and the second fastener opening and a clinch nut is attached to the fastener.

In a further embodiment of any of the above, the cylindrical portion includes a first diameter and the conical portion extends from the first diameter to a second diameter greater than the first diameter.

In a further embodiment of any of the above, the second fastener opening includes a second conical portion located between a first cylindrical portion and a second cylindrical portion.

In a further embodiment of any of the above, the clinch nut includes a clinch nut flange that extends into the second fastener opening

DETAILED DESCRIPTION

Figure 1:
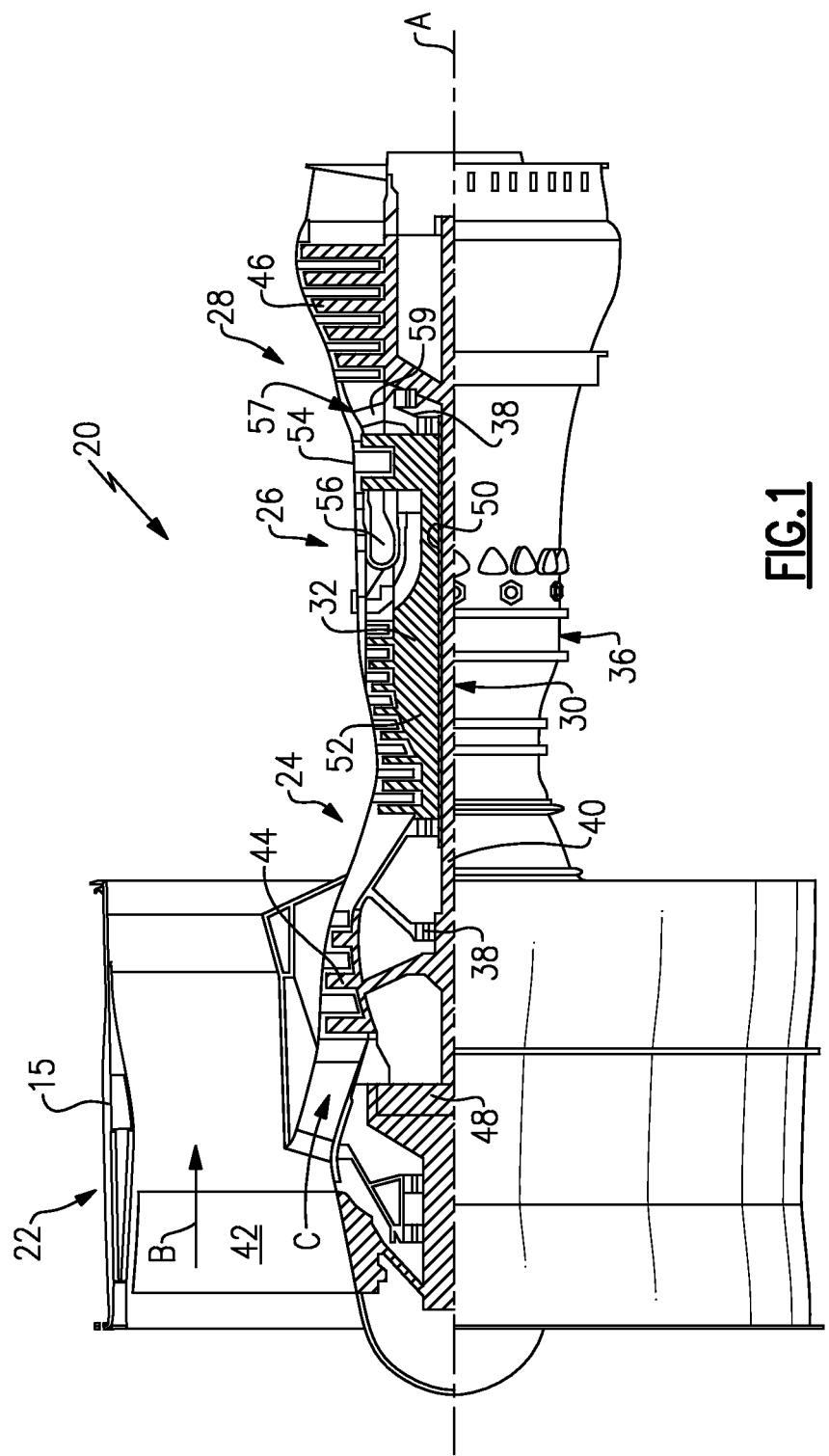
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7\ °\ R)]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
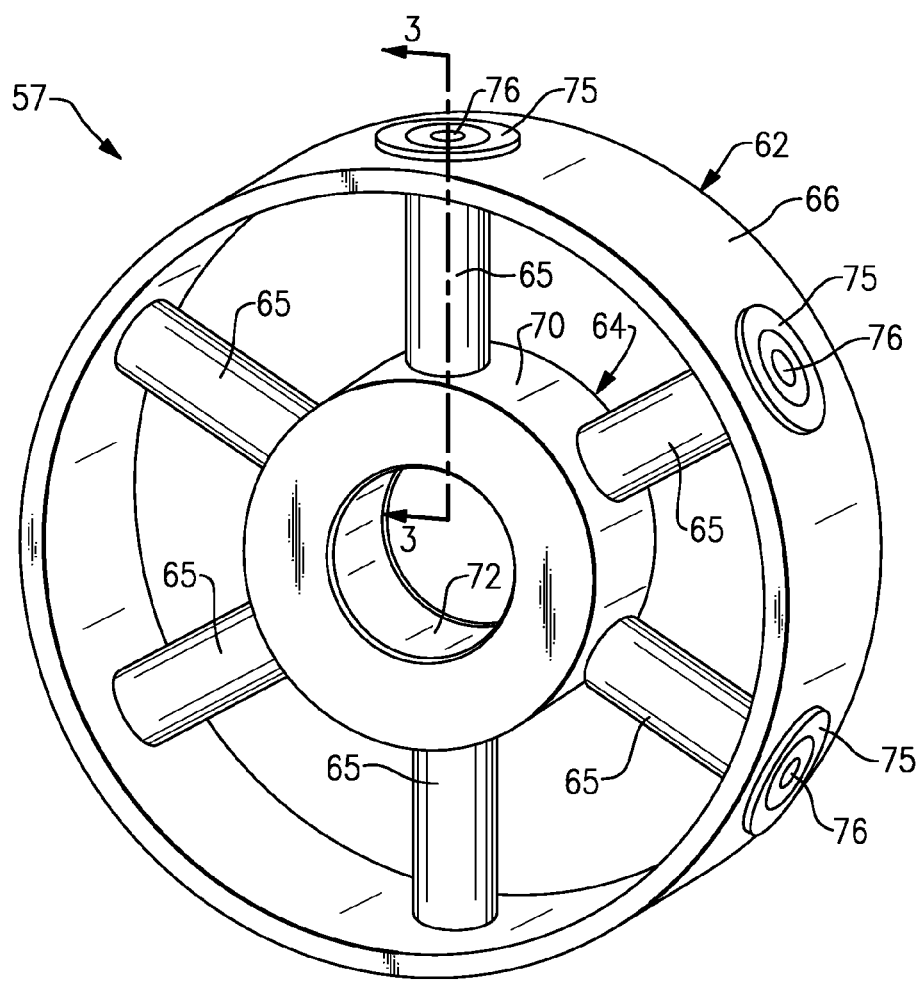
FIG. 2 is a schematic perspective view of an example mid-turbine frame in the gas turbine engine.

FIG. 2 is a schematic perspective view of one embodiment of the mid-turbine frame 57. The schematic view shown in FIG. 2 is high level conceptual view and is intended to illustrate relative positioning of various components, but not actual shape of various components. The mid-turbine frame 57 includes an outer frame case 62, an inner frame case 64, and a plurality of hollow spokes 65. The outer frame case 62 includes an outer diameter surface 66. The inner frame case 64 includes an outer diameter surface 70 and an inner diameter surface 72. In the embodiment shown in FIG. 2, six hollow spokes 65 are distributed around the circumference of the inner frame case 64 to provide structural support between the inner frame case 64 and the outer frame case 62. In alternative embodiments, the mid-turbine frame 57 can have more or less than 6 hollow spokes.

The inner frame case 64 supports the rotor assembly via the bearing assemblies 38 (shown in FIG. 1), and distributes the force from the inner frame case 64 to the outer frame case 62 via the plurality of hollow spokes 65. Attachment of the hollow spokes 65 to the outer frame case 62 is provided at a plurality of bosses 75 located circumferentially around the outer diameter surface 66 of the outer frame case 62.

In one embodiment, attachment of the hollow spokes 65 at the plurality of bosses 75 may be secured by a retaining nut 106 (shown in FIG. 3) that allows the hollow spokes 65 to be tensioned. The hollow spokes 65 can be tensioned via a threaded connection so as to remain in tension during substantially all operating conditions of gas turbine engine 20. Apertures 76 formed in each of the plurality of bosses 75 allow cooling airflow to be distributed into a hollow portion of each of the hollow spokes 65. In this way, the cooling airflow is directed from the outer diameter through the hollow portions of the cooled hollow spokes 65 towards the inner frame case 64. The cooling airflow can function to cool the hollow spokes 65 and also to cool components radially inward of the inner frame case 64, such as the bearings 38. The cooling airflow is then directed to the low-rotor cavity 126 to cool the turbine rotors.

Figure 3:
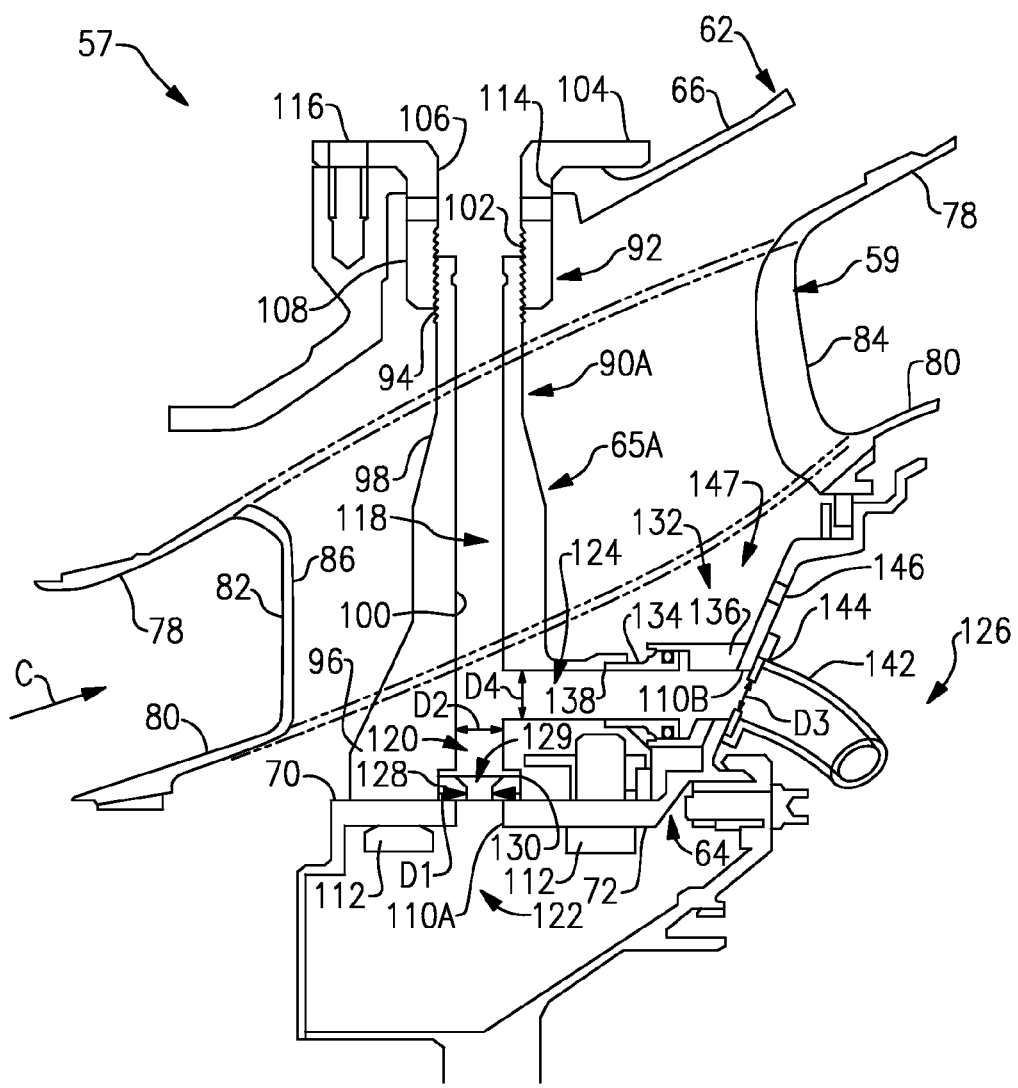
FIG. 3 is a cross-sectional view taken along line 3-3 of FIG. 2.

FIG. 3 is a cross-sectional view of the mid-turbine frame 57 taken along line 3-3 of FIG. 2. A hollow spoke 65A is one example of the hollow spokes 65 shown in FIG. 2. The hollow spoke 65A extends from the outer frame case 62 through the airfoil 59 to the inner frame case 64. The airfoil 59 extends from an outer platform 78 to an inner platform 80. In the illustrated embodiment, the airfoil 59, the outer platform 78, and the inner platform 80 are integrally formed, and are all positioned radially inward of the outer frame case 62 and radially outward of the inner frame case 64. The airfoil 59, the outer platform 78, and the inner platform 80 define a portion of the core flow path C at the mid-turbine frame 57. The airfoil 59 extends axially from a leading edge 82 to a trailing edge 84. The airfoil 59 is oblong so as to be longer in the axial direction than in the circumferential direction. The airfoil 59 has a hollow interior 86, which is also relatively narrow in a chordal direction.

In the illustrated embodiment, the hollow spoke 65A includes a tie rod 90A and a retaining nut 92. The tie rod 90A is an elongated hollow tube that includes a threaded surface 94 at a radially outer end and a flange 96 at a radially inner end. The threaded surface 94 is on an outer surface 98 of the tie rod 90A. An inner passage surface 100 of the tie rod 90A defines an inlet passage 118 through the tie rod 90A. The tie rod 90A tapers along its length from the flange 96 at its radially inner end to the threaded surface 94 at its radially outer end.

The retaining nut 92 includes a threaded surface 102 at a radially inner end of the retaining nut 92 and a flange 104 at a radially outer end of the retaining nut 92. The threaded surface 102 is on an inner surface 106 of the retaining nut 92. The flange 104 extends outward from an outer surface 108 of the retaining nut 92.

In the illustrated embodiment, the flange 96 of the tie rod 90A abuts against the inner frame case 64 so that the inner passage surface 100 aligns with a hole 110A in the inner frame case 64. The flange 96 is attached to the inner frame case 64 via threaded fasteners 112, such as bolts. The retaining nut 92 extends through a hole 114 in the outer frame case 62 such that the flange 104 abuts against the outer diameter surface 66 of the outer frame case 62. The flange 104 is attached to the outer frame case 62 via a bolt 116. The bolt 116 extends through the flange 104 into the outer frame case 62. The tie rod 90A is threaded into the retaining nut 92 to attach the tie rod 90A to the retaining nut 92. In the illustrated embodiment, a portion but not all of the threaded surface 94 overlaps with a portion but not all of the threaded surface 102.

During assembly, the tie rod 90A is inserted through the hollow interior 86 of the airfoil 59 in a direction from radially inward to radially outward. The inner frame case 64 is then positioned radially inward of the tie rod 90A and attached to the tie rod 90A by the threaded fasteners 112. The retaining nut 92 is then inserted through the hole 114 and threadedly engaged with the tie rod 90A. The retaining nut 92 can be tightened, as desired, in a manner described below. Once the retaining nut 92 is suitably tightened on the tie rod 90A, the bolt 116 is inserted to fix the retaining nut 92 to the outer frame case 62 to prevent the retaining nut 92 from rotating and loosening.

Because the threaded surface 94 overlaps with the threaded surface 102 only partially, the threaded connection between the retaining nut 92 and the tie rod 90A is variable. The retaining nut 92 does not bottom out at any particular point when threaded on the tie rod 90A. This allows the retaining nut 92 to be threaded on the tie rod 90A to an extent determined during assembly, not predetermined prior to assembly. This allows the hollow spoke 65A, and the mid-turbine frame 57 in general, to be relatively insensitive to manufacturing tolerances.

The inlet passage 118 branches off between a first branch 120 extending into a bearing support cavity 122 and a second branch 124 extending into a low-rotor cavity 126. The first branch 120 extends in a radially inward direction through the inner frame case 64.

A plug 128 is aligned with the first branch 120 and is located in an opening 130 in the hollow spoke 65A adjacent the outer diameter surface 70 of the inner frame case 64. The plug 128 includes an opening 129 having a conical radially outer portion that tapers to a cylindrical channel on a radially inner side. The cylindrical channel of the plug 128 includes a diameter D1 that is smaller than a diameter D2 defined by the inner passage surface 100. In the illustrated example, the plug 128 includes a diameter D1, however, the diameter D1 could be any dimension that is smaller than the dimension D2 in order to control the amount of cooling airflow that travels into the bearing support cavity 122. Although the plug 128 is shown contacting the hollow spoke 65a and the inner frame case 64, the plug 128 could be located anywhere within the first branch 120.

In another example embodiment, the plug 128 could be solid and prevent the cooling airflow from entering the bearing support cavity 122 so the entire cooling airflow must travel through the second branch 124. In yet another example embodiment, the opening 130 in the tie rod 90A could be reduced to the diameter D1 so that the plug 128 could be eliminated.

The second branch 124 extends in an axially downstream direction perpendicular to the first branch 120. Although the second branch 124 is shown being perpendicular to the first branch 120, the second branch 124 could be within 30 degrees of being perpendicular to the first branch 120. The second branch 124 is in fluid communication with the low rotor cavity through to a fitting 132 that extends through the inner frame case 64 and connects to a swirler tube 142.

Figure 4:
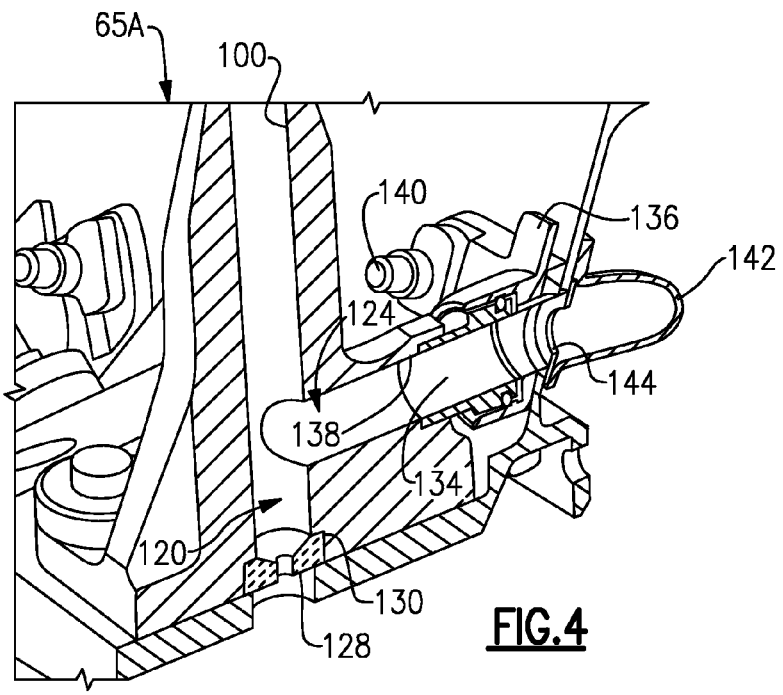
FIG. 4 is a cross-sectional view of an example hollow spoke.
Figure 5:
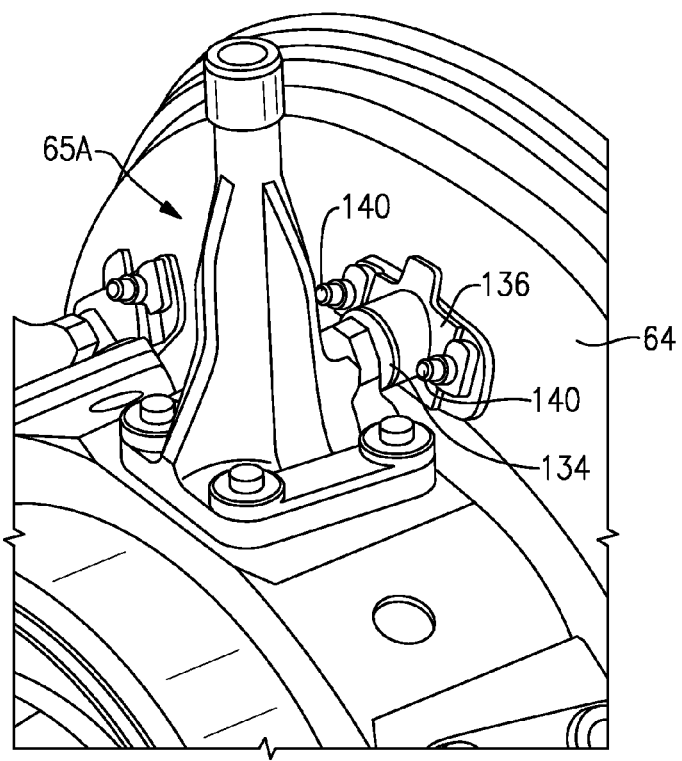
FIG. 5 is a perspective view of the hollow spoke.

The fitting 132 includes a transfer tube 134 pressed, welded, or brazed into an opening 138 in the hollow spoke 65A on a first end and engages a cup boss 136 on a second end. A piston ring creates a seal between an outer diameter of the transfer tube 134 and the cup boss 136. As shown in FIGS. 4 and 5, the cup boss 136 is fastened to the inner frame case 64 with fasteners 140 and is aligned with a hole 110B in the inner frame case 64. The fasteners 140 also secure the swirler tube 142 to an opposite side of the inner frame case 64 from the cup boss 136. The swirler tube 142 directs the cooling airflow into the low rotor cavity in the direction of rotation of the low rotor to reduce turning and aerodynamic losses in the cooling airflow. By pre-swirling the cooling air flow prior to entering the low-rotor cavity 126, the heat up of the cooling air flow is reduced which lowers a temperature of the low-rotor cavity.

A restricting ring 144 is located between the swirler tube 142 and the inner diameter surface 72. The restricting ring 144 includes a diameter D3 which is smaller than a diameter D4 of the second branch 124. The restricting ring 144 restricts the amount of cooling airflow through the second branch 124 to aid in dividing the amount of cooling airflow traveling into the bearing support cavity 122 and the low-rotor cavity 126. Although the restricting ring 144 is shown between the swirler tube 142 and the inner frame case 64, the restricting ring 144 could be located anywhere within the second branch 124 to reduce the cooling airflow into the low-rotor cavity 126. Alternatively, or in addition to the restricting ring 144, a portion of the second branch 124 may include a portion with a reduced diameter, such as reducing a diameter of the second branch 124 extending through the transfer tube 134, the cup boss 136, or the hole 110B to meter the cooling airflow.

In one example, a first portion of cooling airflow travels into the bearing support cavity 122 and a second portion of cooling airflow travel into the low-rotor cavity 126, with the second portion being greater than the first portion.

A connectivity hole 146 is located in the inner frame case 64. The connectivity hole 146 fluidly connects a mid-turbine frame cavity 147 and the low-rotor cavity to supply cooling airflow from the mid-turbine frame cavity 147 without having the cooling airflow mix in the bearing support cavity 122.

Figure 6:
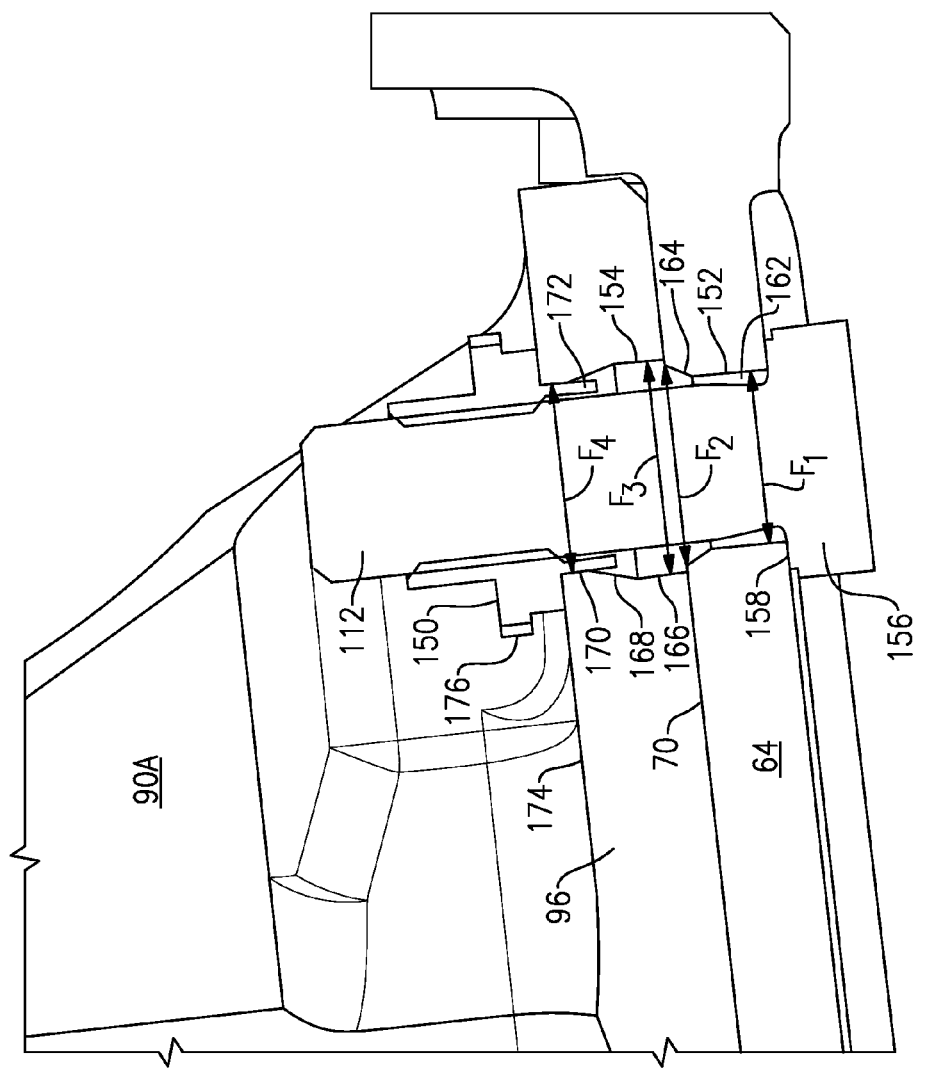
FIG. 6 is an enlarged cross-sectional view of a fastener in the example mid-turbine frame.

FIG. 6 illustrates a section view of the threaded fasteners 112 securing the tie rod 90A to the inner frame case 64 with a clinch nut 150. In one example, the clinch nut 150 is made of a dissimilar material from the tie rod 90A and the threaded fastener 112. The threaded fasteners 112 extend through a fastener opening 152 in the inner frame case 64 and a fastener opening 154 in the flange 96 in the tie rod 90A. The threaded fastener 112 includes a head 156 with a radially outer side 158 relative to the engine axis A adjacent the outer diameter surface 70 of the inner frame case 64.

The fastener opening 152 includes a cylindrical portion 162 on a radially inner side of the inner frame case 64 and a conical portion 164 on a radially outer side of the inner frame case 64. The conical portion 164 includes an increasing diameter in a radially outer direction from a diameter F1 of the cylindrical portion 162 to a diameter F2 adjacent the outer diameter surface 70 of the inner frame case 64.

The fastener opening 154 includes a first cylindrical portion 166 adjacent the inner frame case 64 having a diameter F3. In the illustrated example, the diameter F3 is larger than the diameter F2. In another example, the diameter F3 is equal to the diameter F2. In yet another example, the diameter F3 is less than the diameter F2. The first cylindrical portion 166 extends approximately less than 50% of a thickness of the flange 96 of the tie rod 90A. A conical portion 168 is located radially outward from the first cylindrical portion 166 and tapers from a diameter F3 to a second cylindrical portion 170 having a diameter F4.

Because the diameter F2 of the conical portion 164 is nearly identical to diameter F3 of the first cylindrical portion 166, a load between the flange 96 on the tie rod 90A and the inner frame case 64 is more efficiently transferred when the threaded fastener 112 is tightened against the clinch nut 150.

The clinch nut 150 includes a clinch nut flange 172 that extends radially inward relative a radially outer surface 174 of the flange 96. The clinch nut flange 172 deforms when the threaded fastener 112 is tightened relative to the clinch nut 150 to secure the threaded fastener 112 relative to the clinch nut 150. The diameter F4 is large enough to accommodate the clinch nut flange 172 and the threaded fasteners 112. In the illustrated example, the clinch nut flange 172 extends radially inward past the second cylindrical portion 170 into the conical portion 168. The clinch nut 150 includes a tab 176 that engages a wall 176 of the tie rod 90A to prevent the clinch nut 150 from rotating during installation.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A fastener assembly comprising:
    a first component including a first contact surface and a first fastener opening having a cylindrical portion and a conical portion;
    a second component including a second contact surface and a second fastener opening, wherein the first contact surface is configured to directly contact the second contact surface;
    a fastener for extending through the first fastener opening and the second fastener opening; and
    a clinch nut for attaching to the fastener, wherein the clinch nut includes a clinch nut flange that extends into the second fastener opening.

2. The assembly of claim 1, wherein the clinch nut includes an anti-rotation tab that engages a portion of the second component.

3. The assembly of claim 1, wherein the first component is an inner frame case and the second component is a tie rod.

4. The assembly of claim 1, wherein the fastener is made of a dissimilar material from the first component.

5. The assembly of claim 1, wherein the cylindrical portion includes a first diameter and the conical portion extends from the first diameter to a second diameter greater than the first diameter.

6. The assembly of claim 5, wherein the second diameter at the first contact surface is smaller than a diameter of the second fastener opening at the second contact surface.

7. The assembly of claim 5, wherein the second fastener opening includes a second conical portion.

8. The assembly of claim 7, wherein the second fastener opening includes a first cylindrical portion and a second cylindrical portion defined by the second component and the second conical portion is located axially between the first cylindrical portion and the second cylindrical portion.

9. A mid-turbine frame assembly comprising:
    a mid-turbine frame located axially between a first turbine and a second turbine, the mid-turbine frame comprising:
        an inner frame case including a first fastener opening having a cylindrical portion and a conical portion;
        a tie rod including a second fastener opening;
        a fastener for extending through the first fastener opening and the second fastener opening; and
        a clinch nut for attaching to the fastener, wherein the clinch nut directly contacts the tie rod and includes a clinch nut flange that extends into the second fastener opening.

10. The assembly of claim 9, wherein the cylindrical portion includes a first diameter and the conical portion extends from the first diameter to a second diameter greater than the first diameter.

11. The assembly of claim 10, wherein the second fastener opening includes a first cylindrical portion, a second cylindrical portion, and a second conical portion defined by the tie rod and the second conical portion is located axially between the first cylindrical portion and the second cylindrical portion.

12. The assembly of claim 10, wherein the inner frame case includes a first contact surface and the tie rod includes a second contact surface and the first contact surface directly contacts the second contact surface.

13. The assembly of claim 12, wherein the second diameter at the first contact surface is smaller than a diameter of the second fastener opening at the second contact surface.

14. A method of assembling a portion of a gas turbine engine comprising:
    locating a tie rod adjacent an inner frame;
    aligning a first fastener opening in the inner frame case with a second fastener opening in the tie rod, wherein the first fastener opening includes a cylindrical portion and a conical portion, wherein the inner frame case includes a first contact surface and the tie rod includes a second contact surface and the first contact surface directly contacts the second contact surface;

inserting a fastener through the first fastener opening and the second fastener opening;

attaching a clinch nut to the fastener.

15. The method of claim 14, wherein the clinch nut directly contacts the tie rod and includes a clinch nut flange that extends into the second fastener opening.

16. The method of claim 14, wherein the cylindrical portion includes a first diameter and the conical portion extends from the first diameter to a second diameter greater than the first diameter.

17. The method of claim 16, wherein the second fastener opening includes a first cylindrical portion, a second cylindrical portion, and a second conical portion defined by the tie rod and the second conical portion is located axially between the first cylindrical portion and the second cylindrical portion.

* * * * *